US010727919B2

(12) United States Patent
Nilsson et al.

(10) Patent No.: US 10,727,919 B2
(45) Date of Patent: Jul. 28, 2020

(54) REPORTING OF CHANNEL COEFFICIENTS

(71) Applicant: Telefonaktiebolaget LM Ericsson (Publ), Stockholm (SE)

(72) Inventors: Andreas Nilsson, Göteborg (SE); Fredrik Athley, Kullavik (SE); Sven Petersson, Sävedalen (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 144 days.

(21) Appl. No.: 15/510,518

(22) PCT Filed: Feb. 28, 2017

(86) PCT No.: PCT/EP2017/054592
§ 371 (c)(1),
(2) Date: Mar. 10, 2017

(87) PCT Pub. No.: WO2018/157911
PCT Pub. Date: Sep. 7, 2018

(65) Prior Publication Data
US 2018/0248605 A1    Aug. 30, 2018

(51) Int. Cl.
*H04B 7/06* (2006.01)
*H04L 5/00* (2006.01)

(52) U.S. Cl.
CPC ......... *H04B 7/0626* (2013.01); *H04B 7/0617* (2013.01); *H04B 7/0628* (2013.01); *H04L 5/0048* (2013.01); *H04B 7/0632* (2013.01); *H04B 7/0639* (2013.01)

(58) Field of Classification Search
CPC .. H04B 7/0617; H04B 7/0626; H04B 7/0628; H04B 7/0639; H04B 7/0413; H04B 7/0632; H04L 5/0048; H04L 5/1438
See application file for complete search history.

(56) References Cited

U.S. PATENT DOCUMENTS

| 9,100,074 B1 * | 8/2015 | Zhang | H04B 7/0626 |
| 9,825,682 B2 * | 11/2017 | Park | H04B 7/0413 |
| 9,859,967 B1 * | 1/2018 | Pawar | H04B 7/0617 |

(Continued)

OTHER PUBLICATIONS

Lang P. Withers et al., Title: "Echo-MIMO: A Two-Way Channel Training Method for Matched Cooperative Beamforming," Published in: IEEE Transactions on Signal Processing, vol. 56(9):4419-4432, Sep. 2008 consisting of 14-pages.

(Continued)

*Primary Examiner* — Un C Cho
*Assistant Examiner* — Shah M Rahman
(74) *Attorney, Agent, or Firm* — Christopher & Weisberg, P.A.

(57) ABSTRACT

There are provided mechanisms for reporting channel coefficients to a wireless device. A method is performed by a network node. The method includes receiving reference signals from the wireless device. The method includes transmitting a first set of beam-formed reference signals. The first set of beam-formed reference signals reflects channel coefficients and is based on the received reference signals and the number of beams in the first set of beam-formed reference signals is less than the number of receive antennas in which the reference signals are received, thereby reporting the channel coefficients to the wireless device.

16 Claims, 5 Drawing Sheets

(56) References Cited

U.S. PATENT DOCUMENTS

| | | | |
|---|---|---|---|
| 9,918,240 B2* | 3/2018 | Lee | H04B 7/0469 |
| 2008/0207270 A1* | 8/2008 | Na | H04B 7/0617 |
| | | | 455/562.1 |
| 2009/0323847 A1* | 12/2009 | Na | H04B 7/0413 |
| | | | 375/267 |
| 2010/0238824 A1* | 9/2010 | Farajidana | H04B 7/0417 |
| | | | 370/252 |
| 2013/0051321 A1* | 2/2013 | Barbieri | H04B 7/0626 |
| | | | 370/328 |
| 2013/0121304 A1* | 5/2013 | Nory | H04L 1/1861 |
| | | | 370/330 |
| 2013/0272151 A1* | 10/2013 | Thomas | H04W 24/02 |
| | | | 370/252 |
| 2014/0010318 A1* | 1/2014 | Kim | H04B 7/0639 |
| | | | 375/267 |
| 2014/0185560 A1* | 7/2014 | Kim | H04W 72/0406 |
| | | | 370/329 |
| 2014/0192768 A1* | 7/2014 | Yeh | H04B 7/0469 |
| | | | 370/330 |
| 2014/0192917 A1* | 7/2014 | Nam | H04B 7/0417 |
| | | | 375/267 |
| 2014/0341048 A1* | 11/2014 | Sajadieh | H04L 5/0085 |
| | | | 370/252 |
| 2015/0003543 A1* | 1/2015 | Shirani-Mehr | H04L 12/18 |
| | | | 375/260 |
| 2015/0016379 A1 | 1/2015 | Nam et al. | |
| 2015/0124688 A1* | 5/2015 | Xu | H04B 7/0452 |
| | | | 370/312 |
| 2015/0326299 A1* | 11/2015 | Petersson | H04B 7/0626 |
| | | | 370/329 |
| 2015/0333885 A1* | 11/2015 | Athley | H04B 7/0658 |
| | | | 375/219 |
| 2016/0072563 A1* | 3/2016 | Lee | H04B 7/0421 |
| | | | 375/267 |
| 2016/0142117 A1* | 5/2016 | Rahman | H04B 7/0469 |
| | | | 375/267 |
| 2016/0157218 A1 | 6/2016 | Nam et al. | |
| 2016/0353424 A1 | 12/2016 | Stirling-Gallacher et al. | |
| 2016/0373178 A1 | 12/2016 | Nam et al. | |
| 2017/0055162 A1* | 2/2017 | Takano | H04B 7/0617 |
| 2018/0034612 A1* | 2/2018 | Lin | H04L 5/0048 |
| 2018/0069613 A1* | 3/2018 | Li | H04B 7/06 |

OTHER PUBLICATIONS

International Search Report and Written Opinion dated Nov. 3, 2017 for International Application Serial No. PCT/EP2017/054592, International Filing Date: Feb. 28, 2017 consisting of 16-pages.

European Patent Office Examination Report for Application No. 17 707 156.0 dated Feb. 5, 2019, consisting of 6-pages.

\* cited by examiner

REPORTING OF CHANNEL COEFFICIENTS

CROSS-REFERENCE TO RELATED APPLICATION

This application is a Submission Under 35 U.S.C. § 371 for U.S. National Stage Patent Application of International Application Number: PCT/EP2017/054592, filed Feb. 28, 2017 entitled "REPORTING OF CHANNEL COEFFICIENTS," the entirety of which is incorporated herein by reference.

TECHNICAL FIELD

Embodiments presented herein relate to a method, a network node, a computer program, and a computer program product for reporting channel coefficients to a wireless device. Embodiments presented herein further relate to a method, a wireless device, a computer program, and a computer program product for receiving reporting of channel coefficients from a network node.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for users (e.g. wireless devices) and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network-side (e.g. at transmission points or access nodes) and at the user-side might be required to reach a sufficient link budget.

At the transmission points hundreds of antennas elements are expected to be used for beamforming in order to counteract poor radio channel propagation properties.

In the document "Echo-MIMO: A Two-Way Channel Training Method for Matched Cooperative Beamforming", by Lang P. Withers, Jr., in IEEE Transactions on Signal Processing, Vol. 56, No. 9, September 2008, there is a description of full loop precoding for a wireless device. The purpose of the precoding scheme is to attain channel state information (CSI) in the uplink from the wireless device when the wireless device is not calibrated between transmission and reception. The CSI can then be used at the wireless device for uplink precoding. A simplified signaling diagram of the method described in this document is given in FIG. 1.

Step S1: The wireless device 300 transmits sounding reference signals (SRSs) and the network node 200 receives the transmitted SRSs.

Step S2: The network node 200 amplifies and forwards the received SRSs to the wireless device 300 and the wireless device 300 receives the forwarded SRSs.

Step S3: The wireless device 300 performs an estimation of the round-trip channel $H_{Round}$ using the received SRSs.

Step S4: The network node 200 transmits downlink reference signals (DL-RSs) and the network node 200 receives the transmitted DL-RSs.

Step S5: The wireless device 300 performs an estimation of the downlink channel $H_{DL}$ using the received DL-RSs.

Step S6: The wireless device 300 performs an estimation of the uplink channel $H_{UL}$ by performing element-wise matrix division between $H_{Round}$ and $H_{DL}$.

One issue with the full loop uplink precoding procedure in FIG. 1 is that if the network node 200 has many antennas it generates large overhead, especially due to the forwarded uplink SRSs. The number of forwarded SRSs is equal to M times N, where M is the number of SRSs transmitted from the wireless device (typically given by the number of antennas at the wireless device) and N is the number of receive antennas at the transmission point of the network node. There is also extra overhead due to the required N extra downlink reference signals.

Hence, there is still a need for improved channel estimation procedures.

SUMMARY

An object of embodiments herein is to provide an efficient channel estimation procedure.

According to a first aspect there is presented a method for reporting channel coefficients to a wireless device. The method is performed by a network node. The method comprises receiving reference signals from the wireless device. The method comprises transmitting a first set of beam-formed reference signals. The first set of beam-formed reference signals reflects channel coefficients and is based on the received reference signals and the number of beams in the first set of beam-formed reference signals is less than the number of receive antennas in which the reference signals are received, thereby reporting the channel coefficients to the wireless device.

According to a second aspect there is presented a network node for reporting channel coefficients to a wireless device. The network node comprises processing circuitry. The processing circuitry is configured to cause the network node to receive reference signals from the wireless device. The processing circuitry is configured to cause the network node to transmit a first set of beam-formed reference signals. The first set of beam-formed reference signals reflects channel coefficients and is based on the received reference signals and the number of beams in the first set of beam-formed reference signals is less than the number of receive antennas in which the reference signals are received, the network node thereby reporting the channel coefficients to the wireless device.

According to a third aspect there is presented a network node for reporting channel coefficients to a wireless device. The network node comprises processing circuitry and a storage medium. The storage medium stores instructions that, when executed by the processing circuitry, cause the network node to perform operations, or steps. The operations, or steps, cause the network node to receive reference signals from the wireless device. The operations, or steps, cause the network node to transmit a first set of beam-formed reference signals. The first set of beam-formed reference signals reflects channel coefficients and is based on the received reference signals and the number of beams in the first set of beam-formed reference signals is less than the number of receive antennas in which the reference signals are received, the network node thereby reporting the channel coefficients to the wireless device.

According to a fourth aspect there is presented a network node for reporting channel coefficients to a wireless device. The network node comprises a receive module configured to receive reference signals from the wireless device. The network node comprises a transmit module configured to transmit a first set of beam-formed reference signals. The first set of beam-formed reference signals reflects channel coefficients and is based on the received reference signals and the number of beams in the first set of beam-formed reference signals is less than the number of receive antennas in which the reference signals are received, the network node thereby reporting the channel coefficients to the wireless device.

According to a fifth aspect there is presented a computer program for reporting channel coefficients to a wireless device, the computer program comprises computer program code which, when run on processing circuitry of a network node, causes the network node to perform a method according to the first aspect.

According to a sixth aspect there is presented a method for receiving reporting of channel coefficients from a network node. The method is performed by a wireless device. The method comprises transmitting reference signals to the network node. The method comprises receiving a first set of beam-formed reference signals from the network node. The first set of beam-formed reference signals reflects channel coefficients and is based on the received reference signals and the number of beams in the first set of beam-formed reference signals is less than the number of receive antennas in which the reference signals are received at the network node. According to a seventh aspect there is presented a wireless device for receiving reporting of channel coefficients from a network node. The wireless device comprises processing circuitry. The processing circuitry is configured to cause the wireless device to transmit reference signals to the network node. The processing circuitry is configured to cause the wireless device to receive a first set of beam-formed reference signals from the network node. The first set of beam-formed reference signals reflects channel coefficients and is based on the received reference signals and the number of beams in the first set of beam-formed reference signals is less than the number of receive antennas in which the reference signals are received at the network node.

According to an eighth aspect there is presented a wireless device for receiving reporting of channel coefficients from a network node. The wireless device comprises processing circuitry and a storage medium. The storage medium stores instructions that, when executed by the processing circuitry, cause the wireless device to perform operations, or steps. The operations, or steps, cause the wireless device to transmit reference signals to the network node. The operations, or steps, cause the wireless device to receive a first set of beam-formed reference signals from the network node. The first set of beam-formed reference signals reflects channel coefficients and is based on the received reference signals and the number of beams in the first set of beam-formed reference signals is less than the number of receive antennas in which the reference signals are received at the network node.

According to a ninth aspect there is presented a wireless device for receiving reporting of channel coefficients from a network node. The wireless device comprises a transmit module configured to transmit reference signals to the network node. The wireless device comprises a receive module configured to receive a first set of beam-formed reference signals from the network node. The first set of beam-formed reference signals reflects channel coefficients and is based on the received reference signals and the number of beams in the first set of beam-formed reference signals is less than the number of receive antennas in which the reference signals are received at the network node.

According to a tenth aspect there is presented a computer program for receiving reporting of channel coefficients from a network node, the computer program comprising computer program code which, when run on processing circuitry of a wireless device, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these network nodes, these wireless devices, and these computer programs provide efficient an efficient channel estimation procedure.

Advantageously these methods, these network nodes, these wireless devices, and these computer programs enable the wireless devices to perform an efficient round-trip channel estimation. The round-trip channel estimation can later by the wireless device be used for estimating its uplink channel.

Advantageously these network nodes, these wireless devices, and these computer programs enable the overhead signaling to be reduced substantially for the full loop UL precoding procedure described in FIG. 1.

Advantageously these network nodes, these wireless devices, and these computer programs enables the SNR to, thanks to processing gain in the channel estimation, be improved by the network node forwarding channel estimates instead of the SRS signals.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
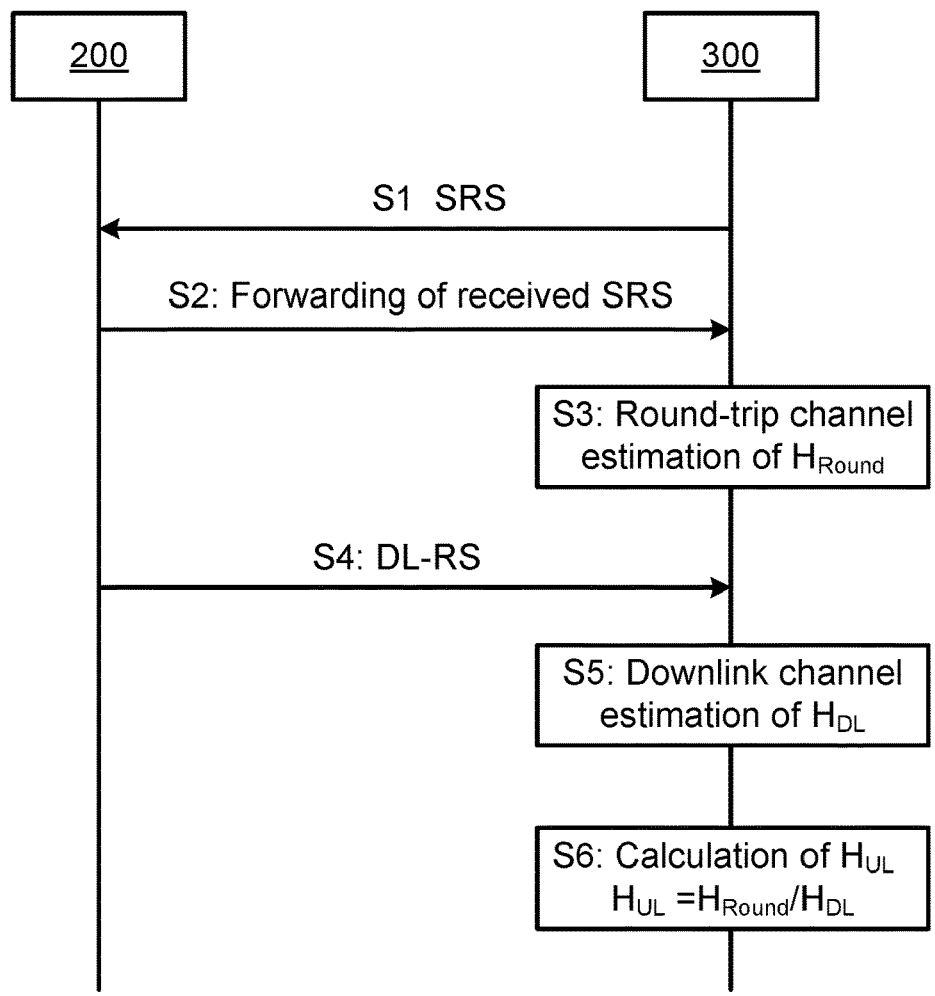
FIG. 1 is a signalling diagram of according to state of the art.
Figure 2:
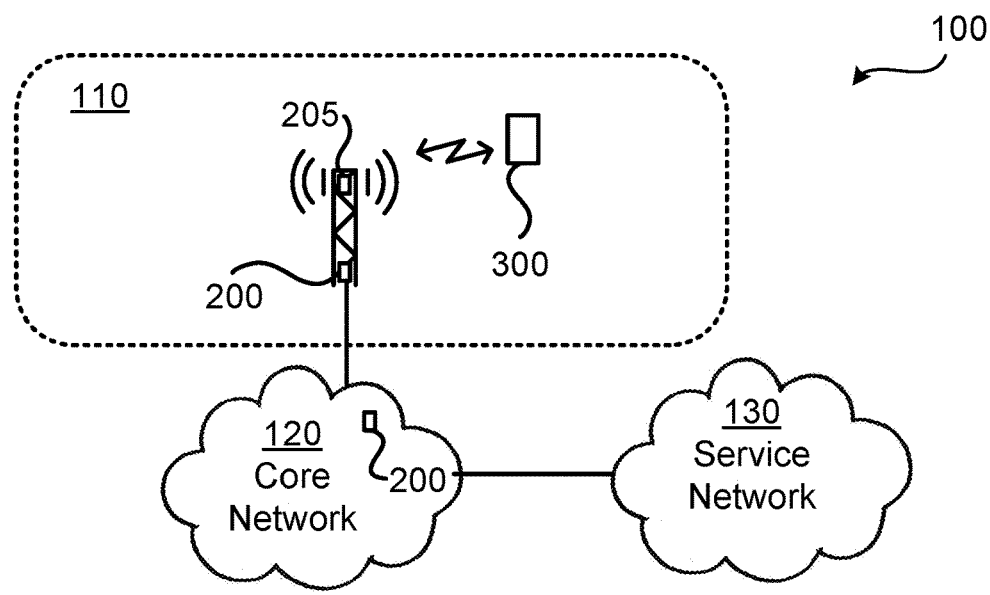
FIG. 2 is a schematic diagram illustrating a communications system according to embodiments.

FIG. 1 is a schematic diagram illustrating a communications system 100 where embodiments presented herein can be applied. The communications system 100 could be a third generation (3G) telecommunications system, a fourth generation (4G) telecommunications system, or a fifth (5G) telecommunications system and support any 3GPP telecommunications standard.

The communications system 100 comprises at least one network node 200 provide network access to wireless devices 300 in a radio access network 110.

The network node 200 provides network access in the radio access network 110 by transmitting signals to, and receiving signals from, the wireless devices 300. The signals could be transmitted from, and received from a radio interface 205 (such as a transmission point, TRP) at the network node 200. The radio interface 205 could form an integral part of the network node 200 or be physically separated from the network node 200.

Further functionalities of the network node 200 and the wireless device 300 and how the network node 200 and the wireless device 300 interact with other entities, nodes, and devices in the communications system 100 will be further disclosed below.

The embodiments disclosed herein thus relate to mechanisms for reporting channel coefficients to a wireless device 300 and receiving reporting of channel coefficients from a network node 200. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a wireless device 300, a method performed by the wireless device 300, and a computer program product comprising code, for example in the form of a computer program, that when run on processing circuitry of the wireless device 300, causes the wireless device 300 to perform the method.

Figure 3:
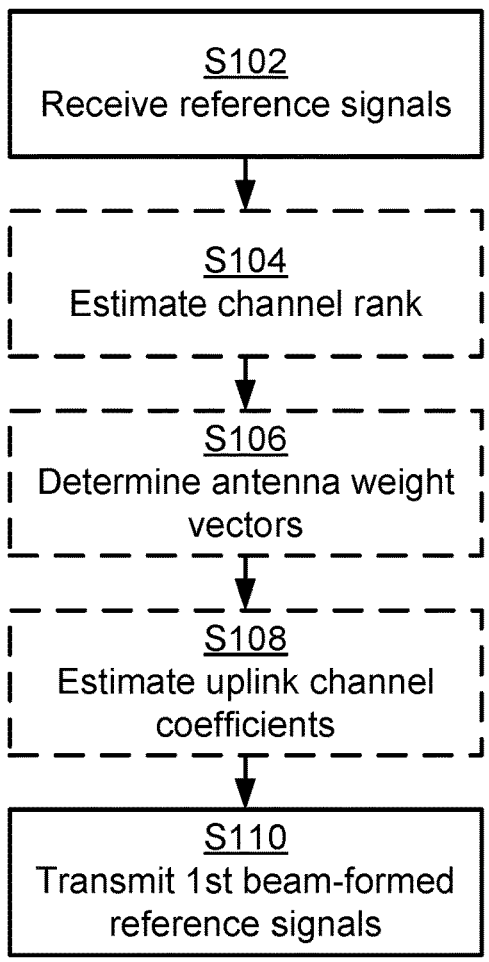
FIGS. 3, 4, 5, and 6 are flowcharts of methods according to embodiments.
Figure 4:
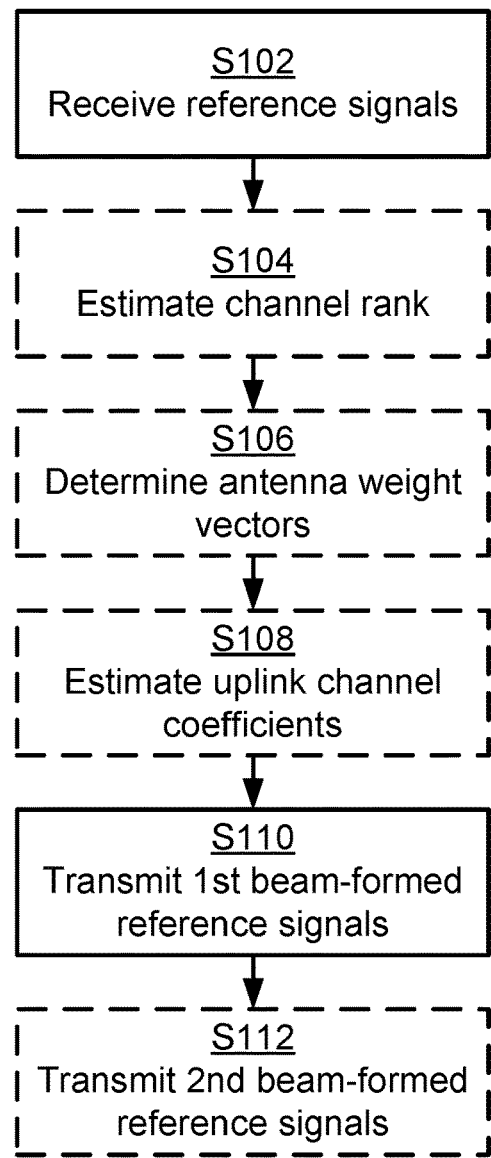
Figure 5:
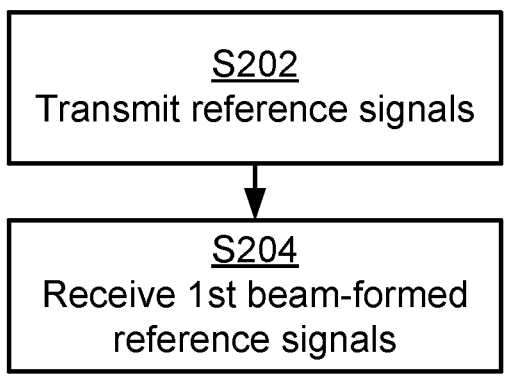
Figure 6:
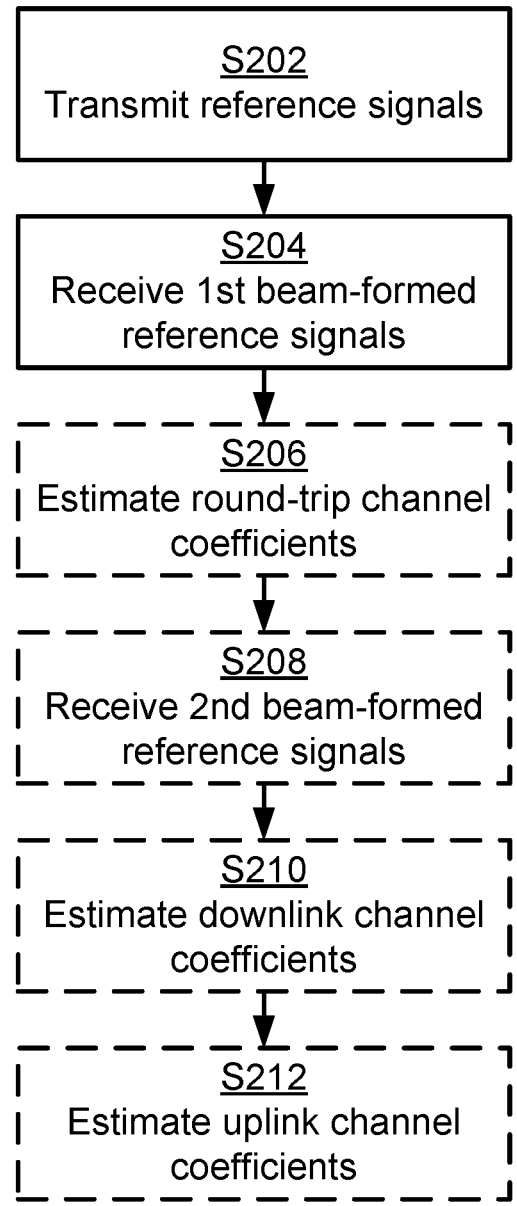

FIGS. 3 and 4 are flowcharts illustrating embodiments of methods for reporting channel coefficients to a wireless device 300 as performed by the network node 200. FIGS. 5 and 6 are flowcharts illustrating embodiments of methods for receiving reporting of channel coefficients from a network node 200 as performed by the wireless device 300. The methods are advantageously provided as computer programs 1220a, 1220b.

Reference is now made to FIG. 3 illustrating a method for reporting channel coefficients to a wireless device 300 as performed by the network node 200 according to an embodiment.

It is assumed that the wireless device 300 transmits reference signals (see below) and that the network node 200 receives the reference signals. Hence, the network node 200 is configured to perform step S102:

S102: The network node 200 receives reference signals from the wireless device 300.

In response to having received the reference signals the network node forms a first set of beam-formed reference signals which is transmitted to the wireless device 300. Hence, the network node 200 is configured to perform step S110:

S110: The network node 200 transmits a first set of beam-formed reference signals.

The first set of beam-formed reference signals reflects channel coefficients. The first set of beam-formed reference signals is based on the received reference signals. In this respect the first set of beam-formed reference signals can be regarded as downlink reference signals whereas the received reference signals can be regarded as uplink reference signals. The number of beams in the first set of beam-formed reference signals is less than number of receive antennas in which the reference signals are received. The network node 200 thereby reports the channel coefficients to the wireless device 300.

There could be different ways for the network node 200 to generate such a first set of beam-formed reference signals. Embodiments relating thereto will be disclosed below.

Embodiments relating to further details of reporting channel coefficients to a wireless device 300 as performed by the network node 200 will now be disclosed.

Reference is now made to FIG. 4 illustrating methods for reporting channel coefficients to a wireless device 300 as performed by the network node 200 according to further embodiments. It is assumed that steps S102, S110 are performed as described above with reference to FIG. 3 and a thus repeated description thereof is therefore omitted.

As mentioned above, there could be different ways for the network node 200 to generate such a first set of beam-formed reference signals. According to a representative embodiment the network node 200 is configured to perform steps S104-S108 as part of generating, or at least determining, the first set of beam-formed reference signals.

S104: The network node 200 estimates the channel rank based on the reference signals received from the wireless device 300.

There could be different ways for the network node 200 to determine the channel rank. In some aspects the channel rank is determined using singular value decomposition (SVD), Fast Fourier Transform (FFT), or correlation of the received reference signals. Hence, according to an embodiment the channel rank is determined using an SVD of the reference signals received from the wireless device 300, or a Fourier transform of the reference signals received from the wireless device 300.

The determination of the channel rank could be performed either in the antenna element space or in the beam space. That is, according to an embodiment the channel rank is determined using a beam-space representation of the reference signals received from the wireless device 300. In order to do so the network node 200 could be configured to perform a transformation from antenna element space to beam space of the reference signals received from the wireless device 300, for example by applying a (spatial) Discrete Fourier Transform (DFT) over the antenna elements.

In some aspects the network node 200 enables the spatial dimensionality of the channel matrix to be reduced, for example by, in the beam space, select the most important beams.

S106: The network node 200 determines antenna weight vectors using the determined channel rank and the received reference signals.

S108: The network node estimates the channel coefficients using the reference signals as if the antenna weight vectors were applied at a radio interface 205 (such as a transmission point) of the network node 200 when receiving the reference signals from the wireless device 300.

The beam-formed reference signals of the first set (of beam-formed reference signals) are then weighted by the, thus estimated, channel coefficients (in contrast to the true channel coefficients, which are unknown) and are transmitted in step S110 using the antenna weight vectors. Each beam-formed reference signal in the first set could be multiplied with a respective one of the channel coefficients before being transmitted in step S110. In some aspects, how many beam-formed reference signals the network node 200 transmits in step S110 equals the channel rank (as estimated in step S104).

In some aspects the network node 200 takes interference into account by using interference rejection combining (IRC) when determining the channel rank and the antenna weight vectors. Hence, according to an embodiment at least one of the determining of the channel rank and the determining of the antenna weight vectors is based on interference rejection combining of the reference signals received from the wireless device 300.

There could be different ways for the network node 200 to act upon having transmitted the first set of beam-formed reference signals. According to some aspects the network node 200 transmits additional reference signal, hereafter denoted a second set of beam-formed reference signals. Hence, according to an embodiment the network node 200 is configured to perform step S112:

S112: The network node 200 transmits a second set of beam-formed reference signals. The second set of beam-formed reference signals is based on the received reference signals without reflecting the channel coefficients. That is, in contrast to the first set of beam-formed reference signals, the second set of beam-formed reference signals does not reflect the channel coefficients. The number of beams in the second set of beam-formed reference signals is less than the number of receive antennas in which the reference signals are received (as in step S102).

There could be different ways to determine the second set of beam-formed reference signals. According to an embodiment the beam-formed reference signals of the second set are transmitted (in step S112) using the antenna weight vectors, but without the beam-formed reference signals of the second set being weighted by the channel coefficients.

Each beam-formed reference signal in the first set, and the second set (if present) could be multiplied with a respective one of the antenna weight vectors before transmission in steps S110 and S112, respectively.

There could be different examples of reference signals transmitted by the wireless device 300 and received by the network node 200. According to an embodiment the reference signals transmitted by the wireless device 300 and received by the network node 200 from the wireless device 300 are uplink reference signals, such as sounding reference signals.

Reference is now made to FIG. 5 illustrating a method for receiving reporting of channel coefficients from a network node 200 as performed by the wireless device 300 according to an embodiment.

In order for the wireless device 300 to receive reporting of channel coefficients the wireless device 300 transmits reference signals. Hence, the wireless device 300 is configured to perform step S202:

S202: The wireless device 300 transmits reference signals to the network node 200.

As disclosed above, the network node 200 in step S110 transmits a first set of beam-formed reference signals to the wireless device 300. It is assumed that the wireless device 300 receives this first set of beam-formed reference signals. Hence, the wireless device 300 is configured to perform step S204:

S204: The wireless device 300 receives a first set of beam-formed reference signals from the network node 200.

As noted above, the first set of beam-formed reference signals reflects channel coefficients. The first set of beam-formed reference signals is based on the received reference signals. The number of beams in the first set of beam-formed reference signals is less than the number of receive antennas in which the reference signals are received at the network node 200.

The first set of beam-formed reference signals thus define the reporting of the channel coefficients from the network node 200, Embodiments relating to further details of receiving reporting of channel coefficients from a network node 200 as performed by the wireless device 300 will now be disclosed.

Reference is now made to FIG. 6 illustrating methods for receiving reporting of channel coefficients from a network node 200 as performed by the wireless device 300 according to further embodiments. It is assumed that steps S202, S204 are performed as described above with reference to FIG. 5 and a thus repeated description thereof is therefore omitted.

As disclosed above, there may be different ways for the network node 200 to determine the beam-formed reference signals of the first set. As disclosed above, according to an embodiment, the beam-formed reference signals of the first set are weighted by the channel coefficients and are transmitted using antenna weight vectors as determined by the network node 200.

There could be different ways for the wireless device 300 to act once having received the first set of beam-formed reference signals from the network node 200 in step S204. In some aspects the wireless device 300 estimates round-trip channel coefficients $H_{Round}$. Hence, according to an embodiment the wireless device 300 is configured to perform step S206:

S206: The wireless device 300 estimates round-trip channel coefficients using the first set of beam-formed reference signals.

As disclosed above, in some embodiments the network node 200 in a step S112 transmits a second set of beam-formed reference signals. The wireless device 300 could then receive such beam-formed reference signals. Hence, according to an embodiment the wireless device 300 is configured to perform step S208:

S208: The wireless device 300 receives the second set of beam-formed reference signals from the network node 200.

As disclosed above, the second set of beam-formed reference signals is based on the transmitted reference signals without reflecting the channel coefficients. According to an embodiment the beam-formed reference signals of the second set are transmitted using the antenna weight vectors without being weighted by the channel coefficients.

There could be different ways for the wireless device 300 to act once having received the second set of beam-formed reference signals from the network node 200 in step S208. In some aspects the wireless device 300 estimates downlink channel coefficients $H_{DL}$. Hence, according to an embodiment the first set of beam-formed reference signals reflects uplink channel coefficients and the wireless device 300 is configured to perform step S210:

S210: The wireless device 300 estimates downlink channel coefficients using the second set of beam-formed reference signals.

The wireless device 300 could then estimate the uplink channel coefficients $H_{UL}$. Hence, according to an embodiment the wireless device 300 is configured to perform step S212:

S212: The wireless device 300 estimates the uplink channel coefficients using the round-trip channel coefficients and the downlink channel coefficients. One way for the wireless device 300 to estimate the uplink channel coefficients is to perform an element-wise matrix division between $H_{Round}$ and $H_{DL}$.

In summary, the herein disclosed embodiments enable a network node 200 receiving SRSs to perform an SVD to determine the possible uplink channel rank and the corresponding SVD-based receiver weight vectors. For each attained SVD-based receiver weight vector the network node 200 estimates the uplink channel. The uplink channel estimate is then multiplied with DL-RS signals that are transmitted back to the wireless device 300 using the SVD-based weight vectors. The network node 200 also transmits DL-RS using the same SVD-based receiver weight vectors but without being multiplied with the uplink channel estimate. When the network node 200 transmits the forwarded SRS and DL-RS it is enough to form as many beams as the channel rank, which typically is much less than the number of antennas at the radio interface 205 of the network node 200.

Figure 7:
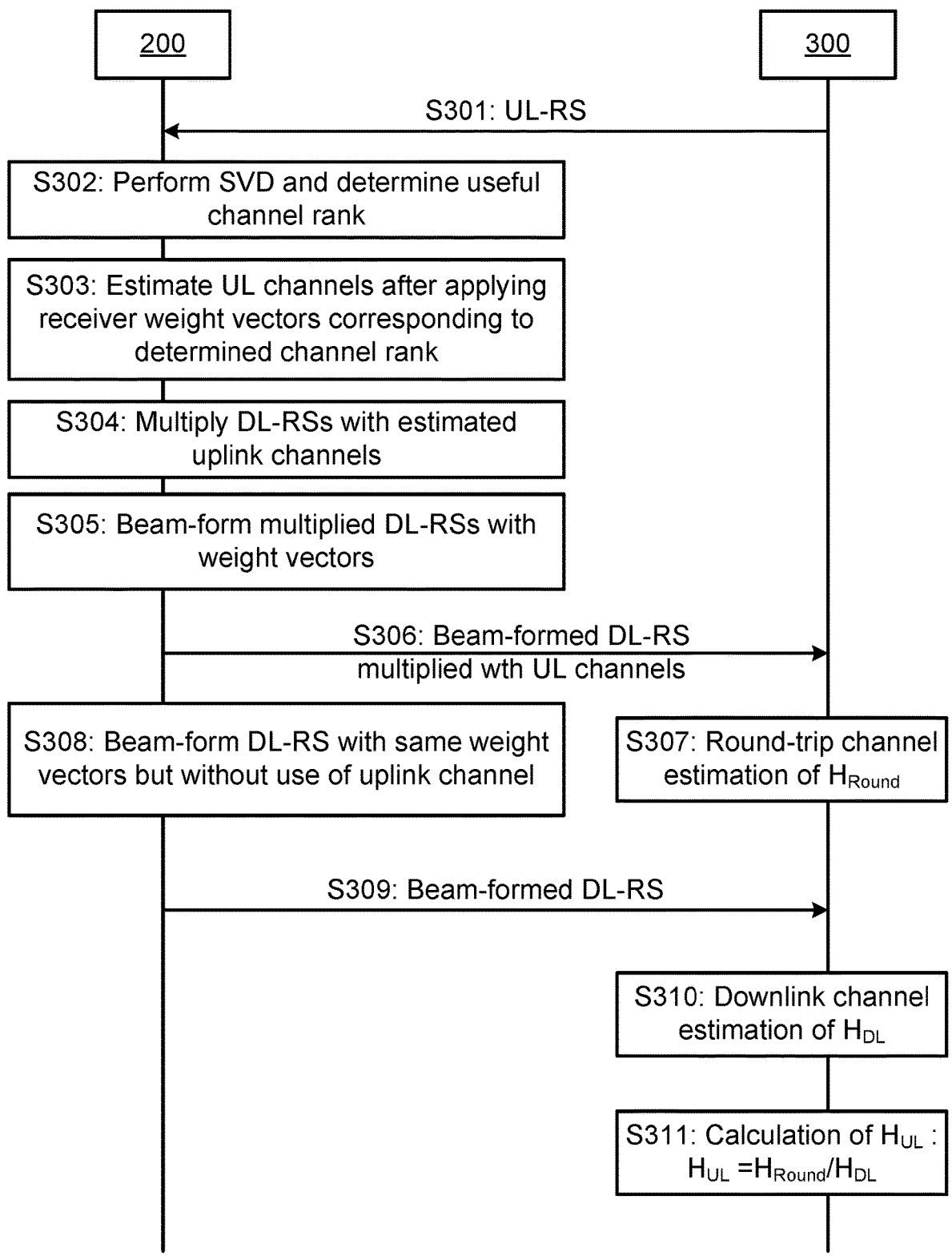
FIG. 7 is a signalling diagram of according to an embodiment.

One particular embodiment for reporting of channel coefficients and receiving such reporting as performed by the network node 200 and the wireless device 300 based on at least some of the above disclosed embodiments will now be disclosed in detail with reference to the flowchart of FIG. 7.

S301: The wireless device 300 transmits uplink reference signals (UL-RSs), such as SRSs, at all its antennas and the UL-RSs are received by the network node 200 from all these antennas.

S302: The network node 200 performs an SVD using the received UL-RSs. Based on the SVD the network node 200 determines a useful channel rank for coming uplink transmissions as well as the corresponding SVD-based weights vectors and singular values for the determined channel rank.

It is here possible for the network node 200 to take other aspects, such as interference rejection, into account when determining the channel rank and the SVD-based weights vectors.

S303: The network node 200 estimates the uplink channels for the UL-RSs as if the SVD-based weight vectors were applied when receiving the UL-RSs.

S304: The network node 200 multiples DL-RSs with the uplink channels as estimated in step S303 such that each DL-RS is multiplied with one uplink channel estimate. The resulting number of multiplied DL-RSs thus equals the channel rank.

S305: The network node 200 beam-forms the DL-RSs that were multiplied with the estimated uplink channels in step S304 with the SVD-based weights vectors.

S306: The network node 200 transmits the DL-RSs as beam-formed in step S305. The wireless receives the transmitted DL-RSs.

S307: The wireless device 300 determines channel estimates of the round-trip channel $H_{Round}$ using the DL-RSs received in step S306.

S308: The network node 200 beam-forms DL-RSs with the SVD-based weights vectors and without being multiplied with the estimated uplink channels.

S309: The network node 200 transmits the DL-RS on which the beamforming weights have been applied in step S308. The wireless receives the transmitted DL-RSs.

S310: The wireless device 300 determines channel estimates of the downlink channel $H_{DL}$ using the DL-RSs received in step S309.

S311: The wireless device 300 estimates the uplink channel, $H_{UL}$, by performing element-wise matrix division between $H_{Round}$ and $H_{DL}$.

In the prior art, defined by the above-mentioned document "Echo-MIMO: A Two-Way Channel Training Method for Matched Cooperative Beamforming", by Lang P. Withers, Jr., in IEEE Transactions on Signal Processing, Vol. 56, No. 9, September 2008, a channel estimate is not performed at the network node 200; the received SRSs is just amplified and forwarded back to the wireless device 300. However, by performing channel estimations at the network node 200 before transmitting information back to the wireless device 300, processing gain is attained of the received uplink reference signals in case the coherence bandwidth is larger than the frequency spacing between the uplink reference signal resource elements, which commonly is the case. This will improve the accuracy of the final uplink channel state information (such as CSI) at the wireless device 300.

The extra overhead signaling due to the multiplied DL-RS is equal to M times K, where M is the number of uplink reference signals transmitted from the wireless device 300 (typically given by number of antennas at the wireless device 300) and K is the number of beams used by the network node 200 to transmit the first set of beam-formed reference signals (typically given by the estimated channel rank). In case the channel rank is smaller than the number of antenna ports at the network node 200 the overhead signaling will be reduced compared to the prior art.

Figure 8:
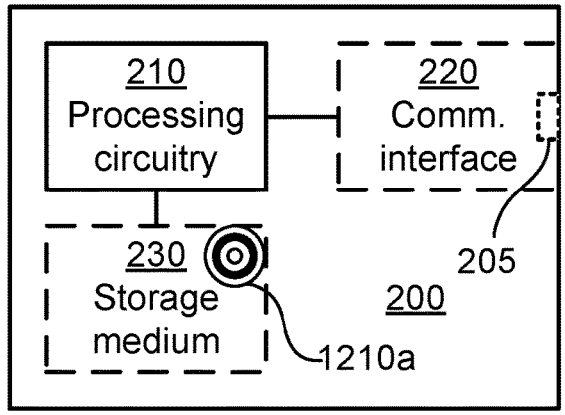
FIG. 8 is a schematic diagram showing functional units of a network node according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S112, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, nodes, and devices in the communications network 100, especially the wireless device 300. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 9:
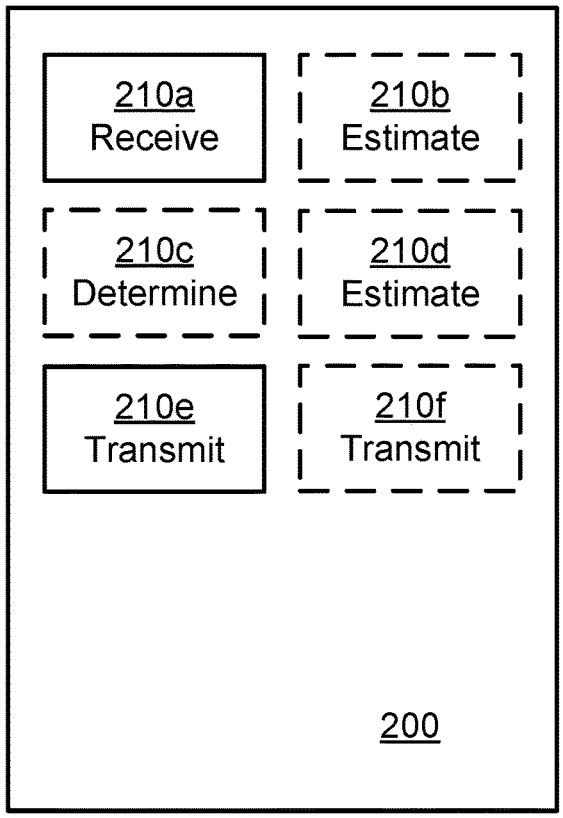
FIG. 9 is a schematic diagram showing functional modules of a network node according to an embodiment.

FIG. 9 schematically illustrates, in terms of a number of functional modules, the components of a network node 200 according to an embodiment. The network node 200 of FIG. 9 comprises a number of functional modules; a receive module 210a configured to perform step S102 and a transmit module 210e configured to perform step S110. The network node 200 of FIG. 9 may further comprise a number of optional functional modules, such as any of a estimate module 210b configured to perform step S104, a determine module 210c configured to perform step S106, an estimate module 210d configured to perform step S108, and a transmit module 210f configured to perform step S112. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of the network node 200 as disclosed herein.

Figure 10:
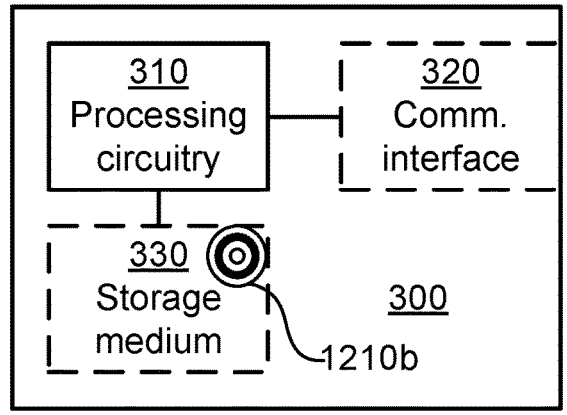
FIG. 10 is a schematic diagram showing functional units of a wireless device according to an embodiment.

FIG. 10 schematically illustrates, in terms of a number of functional units, the components of a wireless device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300 to perform a set of operations, or steps, S202-S212, as disclosed above. For example, the storage medium 330 may store the set of operations, and the processing circuitry 310 may be configured to retrieve the set of operations from the storage medium 330 to cause the wireless device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300 may further comprise a communications interface 320 for communications with other entities, nodes, and devices in the communications network 100, especially the network node 200. As such the communications interface 320 may comprise one or more transmitters and receivers, comprising analogue and digital components.

The processing circuitry 310 controls the general operation of the wireless device 300 e.g. by sending data and control signals to the communications interface 320 and the storage medium 330, by receiving data and reports from the communications interface 320, and by retrieving data and instructions from the storage medium 330. Other components, as well as the related functionality, of the wireless device 300 are omitted in order not to obscure the concepts presented herein.

Figure 11:
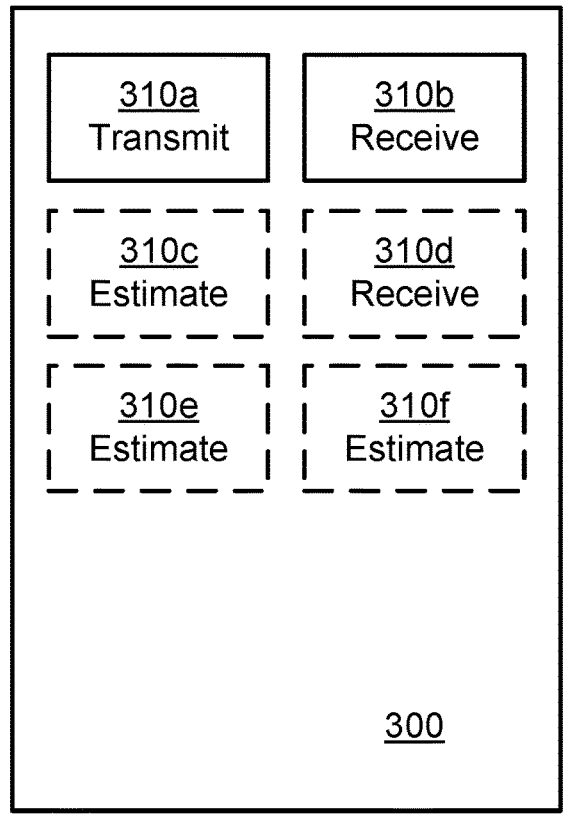
FIG. 11 is a schematic diagram showing functional modules of a wireless device according to an embodiment.

FIG. 11 schematically illustrates, in terms of a number of functional modules, the components of a wireless device 300 according to an embodiment. The wireless device 300 of FIG. 11 comprises a number of functional modules; a transmit module 310a configured to perform step S202 and a receive module 310b configured to perform step S204. The wireless device 300 of FIG. 11 may further comprise a number of optional functional modules, such as any of an estimate module 310c configured to perform step S206, a receive module 310d configured to perform step S208, an estimate module 310e configured to perform step S210, and an estimate module 310f configured to perform step S212. In general terms, each functional module 310a-310f may be implemented in hardware or in software. Preferably, one or more or all functional modules 310a-310f may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310f and to execute these instructions, thereby performing any steps of the wireless device 300 as disclosed herein.

The network node 200 and/or wireless device 300 may be provided as a respective standalone device or as a part of at least one further device. For example, the network node 200 may be provided in a node of the radio access network or in a node of the core network. Alternatively, functionality of the network node 200 and/or wireless device 300 may be distributed between at least two devices, or nodes. Thus, a first portion of the instructions performed by the network node 200 and/or wireless device 300 may be executed in a respective first device, and a second portion of the of the instructions performed by the network node 200 and/or wireless device 300 may be executed in a respective second device; the herein disclosed embodiments are not limited to any particular number of devices on which the instructions performed by the network node 200 and/or wireless device 300 may be executed. Hence, the methods according to the herein disclosed embodiments are suitable to be performed by a network node 200 and/or wireless device 300 residing in a cloud computational environment. Therefore, although a single processing circuitry 210, 310 is illustrated in FIGS. 8 and 10 the processing circuitry 210, 310 may be distributed among a plurality of devices, or nodes. The same applies to the functional modules 210a-210f, 310a-310f of FIGS. 9 and 11 and the computer programs 1220a, 1220b of FIG. 12 (see below).

Figure 12:
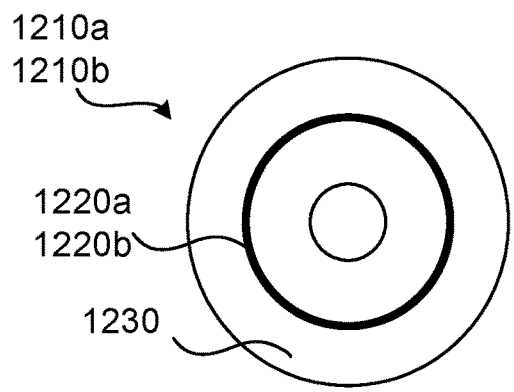
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the network node 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the wireless device 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

Further, although the herein disclosed embodiments have been described based on the network node 200 performing steps S102-S112 (and the corresponding steps in FIG. 7) and the wireless device 300 performing steps S202-S208 (and the corresponding steps in FIG. 7), the network node 200 could be configured to perform steps S202-S208 (and the corresponding steps in FIG. 7) and the wireless device 300 could be configured to perform steps S102-S112 (and the corresponding steps in FIG. 7), thus replacing the terms downlink and uplink with each other such that downlink becomes uplink and uplink becomes downlink. Generally, a first radio transceiver device could be configured to perform steps S102-S112 (and the corresponding steps in FIG. 7) and a second radio transceiver device could be configured to perform steps S202-S208 (and the corresponding steps in FIG. 7), thus replacing both the terms downlink and uplink with sidelink such that downlink becomes a first sidelink and uplink becomes a second sidelink. In this respect, in some aspects there is thus not a given hierarchical relation between the first radio transceiver device and the second radio transceiver device.

The invention claimed is:

1. A method for reporting channel coefficients to a wireless device, the method being performed by a network node, the method comprising:
receiving reference signals from the wireless device;
determining channel rank based on the reference signals received from the wireless device;
determining antenna weight vectors using the determined channel rank and the received reference signals;
estimating the channel coefficients using the reference signals;
transmitting a first set of beam-formed reference signals using the determined antenna weight vectors, each beam-formed reference signal being multiplied by an estimated channel coefficient and being based on the received reference signals, the first set of beam-formed reference signals conveying uplink channel coefficients;
transmitting a second set of beam-formed reference signals, the second set of beam-formed reference signals being based on the received reference signals without conveying the uplink channel coefficients; and
estimating downlink channel coefficients using the second set of beam-formed reference signal a number of beams in the first set of beam-formed reference signals being less than a number of receive antennas by which the reference signals are received.

2. The method according to claim 1, wherein the beam-formed reference signals of the second set are transmitted using antenna weight vectors without the beam-formed reference signals of the second set being weighted by the estimated channel coefficients.

3. The method according to claim 1, wherein spatial dimensionality of the reference signals received from the wireless device is reduced when having determined the channel rank.

4. The method according to claim 1, wherein the channel rank is determined using one from the group consisting of a singular value decomposition of the reference signals received from the wireless device and a Fourier transform of the reference signals received from the wireless device.

5. The method according to claim 1, wherein the channel rank is determined using a beam-space representation of the reference signals received from the wireless device.

6. The method according to claim 1, wherein at least one of the determining of the channel rank and the determining of the antenna weight vectors is based on interference rejection combining of the reference signals received from the wireless device.

7. The method according to claim 1, wherein the number of beam-formed reference signals the network node transmits equals the channel rank.

8. The method according to claim 1, wherein each beam-formed reference signal in the first set, and the second set is multiplied with a respective one of the antenna weight vectors.

9. The method according to claim 1, wherein the reference signals received from the wireless device are sounding reference signals.

10. A method for receiving reporting of channel coefficients from a network node, the method being performed by a wireless device, the method comprising:
transmitting reference signals to the network node;
receiving a first set of beam-formed reference signals from the network node, each beam-formed reference signal being multiplied by a channel coefficient and being based on the transmitted reference signals, a number of beams in the first set of beam-formed reference signals being less than a number of receive antennas by which the reference signals are received at the network node, the first set of beam-formed reference signals conveying uplink channel coefficients;

receiving a second set of beam-formed reference signals from the network node, the second set of beam-formed reference signals being based on the transmitted reference signals without conveying the uplink channel coefficients; and estimating downlink channel coefficients using the second set of beam-formed reference signals.

11. The method according to claim 10, wherein the beam-formed reference signals of the first set are weighted by the channel coefficients and are transmitted using antenna weight vectors as determined by the network node.

12. The method according to claim 10, further comprising:

estimating round-trip channel coefficients using the first set of beam-formed reference signals.

13. The method according to claim 11, wherein the beam-formed reference signals of the second set are transmitted using the antenna weight vectors without being weighted by the channel coefficients.

14. The method according to claim 10, further comprising:

estimating the uplink channel coefficients using round-trip channel coefficients and the downlink channel coefficients.

15. A network node for reporting channel coefficients to a wireless device, the network node comprising:

processing circuitry; and a storage medium storing instructions that, when executed by the processing circuitry, cause the network node to:

receive reference signals from the wireless device; determine channel rank based on the reference signals received from the wireless device;

determine antenna weight vectors using the determined channel rank and the received reference signals;

estimate channel coefficients based on the reference signals;

transmit a first set of beam-formed reference signals using the determined antenna weight vectors, each beam-formed reference signal being multiplied by a channel coefficient and being based on the received reference signals, the first set of beam-formed reference signals conveying uplink channel coefficients, a number of beams in the first set of beam-formed reference signals being less than number of receive antennas by which the reference signals are received, thereby reporting the channel coefficients to the wireless device;

transmit a second set of beam-formed reference signals, the second set of beam-formed reference signals being based on the received reference signals without conveying the uplink channel coefficients; and estimate downlink channel coefficients using the second set of beam-formed reference signals, a number of beams in the first set of beam-formed reference signals being less than a number of receive antennas by which the reference signals are received.

16. A wireless device for receiving reporting of channel coefficients from a network node, the wireless device comprising:

processing circuitry; and a storage medium storing instructions that, when executed by the processing circuitry, cause the wireless device to:

transmit reference signals to the network node;

receive a first set of beam-formed reference signals from the network node, the first set of beam-formed reference signal being multiplied by a channel coefficient and being based on the transmitted reference signals, a number of beams in the first set of beam-formed reference signals being less than a number of receive antennas by which the reference signals are received at the network node, the first set of beam-formed reference signals conveying uplink channel coefficients;

receive a second set of beam-formed reference signals from the network node, the second set of beam-formed reference signals being based on the transmitted reference signals without conveying the uDlink channel coefficients; and estimate downlink channel coefficients using the second set of beam-formed reference signals.

* * * * *